United States Patent [19]

Merritt

[11] Patent Number: 5,568,151

[45] Date of Patent: Oct. 22, 1996

[54] STATISTICAL AVERAGING METHOD FOR WIND PROFILER DOPPLER SPECTRA

[76] Inventor: David A. Merritt, 982 N. Cedar Brook Rd., Boulder, Colo. 80304

[21] Appl. No.: 442,969

[22] Filed: May 17, 1995

[51] Int. Cl.$^6$ .............................. G01S 7/41; G01S 13/95
[52] U.S. Cl. ............................ 342/192; 342/26; 342/196
[58] Field of Search .................................. 342/192, 193, 342/26, 195, 196

[56] References Cited

U.S. PATENT DOCUMENTS

| | | | |
|---|---|---|---|
| 5,027,122 | 6/1991 | Wieler | 342/26 |
| 5,068,597 | 11/1991 | Siverstein et al. | 324/77 D |
| 5,122,805 | 6/1992 | Peterman et al. | 342/26 |
| 5,173,704 | 12/1992 | Buehler et al. | 342/26 |
| 5,247,303 | 9/1993 | Cornelius et al. | 342/26 |
| 5,294,155 | 2/1995 | Rubin et al. | 342/192 |
| 5,469,168 | 11/1995 | Anderson | 342/26 |

Primary Examiner—John B. Sotomayor
Attorney, Agent, or Firm—Watson Cole Stevens Davis, P.L.L.C.

[57] ABSTRACT

This method for Doppler spectral processing more readily identifies the profiler radar return signals from the atmosphere in the presence of contamination, e.g., from bird echoes, ground clutter, and radio frequency interference. Profiler radars measure winds in the atmosphere by using backscatter (i) from refractive index fluctuations in clear air due to turbulence or (ii) from precipitation such as rain or snow. These radars also receive contaminating radar returns from ground clutter (e.g., from vehicles, power lines, and trees) and from fliers (e.g., aircraft, insects, and birds). In general, the radar return signals from the atmosphere have statistical and physical properties different from those properties for the contaminating radar returns. This new method uses these differences to eliminate or reduce contamination in radar Doppler spectra for estimation of atmospheric winds.

4 Claims, 9 Drawing Sheets

After SAM (Range Gate 8)

STATISTICAL AVERAGING METHOD FOR WIND PROFILER DOPPLER SPECTRA

FIELD OF THE INVENTION

This invention relates to a statistical averaging method for wind profiler Doppler spectra for distinguishing atmospheric returns due to turbulence from other returns, such as those generated by birds and the like.

BACKGROUND OF THE INVENTION

Various Doppler radar techniques are known in the art. Examples are taught in the following references, which are hereby incorporated in their entirety by reference into this specification:

U.S. Pat. No. 5,027,122 to Wieler, Jun. 25, 1991;

U.S. Pat. No. 5,122,805 to Peterman et al, Jun. 16, 1992;

U.S. Pat. No. 5,173,704 to Buehler et al, Dec. 22, 1992;

Chadwick, R. B., A. S. Frisch, and R. G. Strauch, 1984: A feasibility study on the use of wind profilers to support space shuttle launches. NASA contractor report, 3861.

Gage, K. S., and B. B. Balsley, 1978: Doppler radar probing of the clear atmosphere. *Bull. Amer. Meteor. Soc.*, 59, 1074–1093.

Gauthreaux, Jr., S. A., 1991: The flight behavior of migrating birds in changing wind fields: radar and visual analyses. *Amer. Zool.*, 31, 187–204.

Gossard, E. E., and R. G. Strauch, 1983: Radar observations of clear air and clouds. *Developments in Atmospheric Science*, 14, Elsevier Science, New York, 280 pp.

Hildebrand, P. H., and R. S. Sekhon, 1974: Objective determination of the noise level in Doppler spectra. *J. Appl. Meteor.*, 13, 808–811.

Hoehne, W. E., 1980: Precision of National Weather Service upper air measurements. NOAA Tech. Memo. NWS T&ED-16, 12 pp.

Knight, C. A., and L. J. Miller, 1993: First radar echoes from cumulus clouds. *Bull. Amer. Meteor. Soc.*, 74, 179–188.

May, P. T., 1993: Comparison of Wind Profiler and Radiosonde Measurements in the Tropics. *J. Atmos. Ocean. Technol.*, 10, 122–127.

Moran, K. P., R. G. Strauch, K. B. Earnshaw, D. A. Merritt, B. L. Weber, and D. B. Wuertz, 1989: Lower tropospheric wind profiler. 24th Conference on radar meteorology, Mar. 27–31, 1989, Tallahassee, Fla., AMS, Boston, Mass., 729–731.

Nathanson, F. E., 1969: Radar design principles. McGraw Hill, 626 pp.

Ottersten, H., 1969: Atmospheric structure and radar backscattering in clear air. *Radio Sci.*, 4, 1179–1193.

Strauch, R. G., D. A. Merritt, K. P. Moran, K. B. Earnshaw, and D. van de Kamp, 1984: The Colorado wind-profiling network. *J. Atmos. Ocean. Technol.*, 1, 37–49.

Strauch, R. G., B. L. Weber, A. S. Frisch, C. G. Little, D. A. Merritt, K. P. Moran, and D. C. Welsh, 1987: The precision and relative accuracy of profiler wind measurements. *J. Atmos. Ocean. Techhnol.*, 4, 563–571.

Vaughn, C. R., 1985: Birds and insects as radar targets: A review. *Proc. IEEE*, 73, 205–227.

Weber, B. L., D. B. Wuertz, R. G. Strauch, D. A. Merritt, K. P. Moran, D. C. Law, D. van de Kamp, R. B. Chadwick, M. H. Ackley, M. F. Barth, N. L. Abshire, P. A. Miller, and T. W. Schlatter, 1990: Preliminary evaluation of the first NOAA demonstration network wind profiler. *J. Atmos. Ocean. Technol.*, 7, 909–918.

Weber, B. L., D. B. Wuertz, D. C. Law, A. S. Frisch, and J. M. Brown, 1992: Effects of small-scale vertical motion on radar measurements of wind and temperature profiles. *J. Atmos. Ocean. Technol.*, 9, 193–209.

Weber, B. L., D. B. Wuertz, D. C. Welsh, and R. McPeek, 1993: Quality controls for profiler measurements of winds and RASS temperatures. *J. Atmos. Ocean. Technol.*, 10, 452–464.

Wesely, M. L., 1976: The combined effect of temperature and humidity fluctuations on refractive index. *J. Appl. Meteor.*, 15, 43–49.

Wilczak, J. M., R. G. Strauch, F. M. Ralph, B. L. Weber, D. A. Merritt, J. R. Jordan, D. E. Wolfe, L. K. Lewis, D. B. Wuertz, J. E. Gaynor, S. A. McLaughlin, R. R. Rogers, A. C. Riddle, and T. S. Dye, 1994: Contamination of wind profiler data by migrating birds: Characteristics of corrupt bird data and potential solutions. (in review)

Wuertz, D. B., B. L. Weber, R. G. Strauch, A. S. Frisch, C. G. Little, D. A. Merritt, K. P. Moran, and D. C. Welsh, 1988: Effects of precipitation on UHF wind profiler measurements. *J. Atmos. Ocean. Technol.*, 5, 450–465.

Since Gage and Balsley (1978) summarized Doppler radar capability for probing the atmosphere, wind profiling radars have been used successfully for meteorological research and they have been considered for routine operations (Strauch et al, 1984). More recently, profilers were deployed in the NOAA Demonstration Network for evaluation by the National Weather Service (Weber et al., 1990). Profilers are expected to have a growing impact upon weather forecasting, environmental pollution monitoring, climate and mesoscale modelling, air traffic control, and more.

It is important, therefore, that the wind measurements of these radars be both accurate and reliable. Strauch et al. (1987) showed that in clear air, small-scale meteorological variability probably limits the precision of profilers, being not much different from that of conventional radiosondes (Hoehne, 1980). At UHF frequencies, measurement errors can become large in the presence of precipitation, but when appropriate methods are used a profiler can use the much stronger radar return from precipitation to its advantage (Wuertz et al., 1988). At VHF frequencies, May (1993) found little effect on observations due to precipitation. More recent studies suggest that accuracy and reliability are improved with high-resolution sampling using five-beam antenna systems (Weber et al., 1992) and with improved data processing and quality controls (Weber et al., 1993).

Nevertheless, it is now recognized that profilers sometimes have large measurement errors in the presence of radar returns from unwanted targets. Profilers are especially sensitive to contamination from other targets whose radar echoes can be orders-of-magnitude stronger than the clear-air return. Ground clutter, sea clutter, and echoes from precipitation or clouds can enter low-angle antenna sidelobes, producing signals that are sometimes mistaken for atmospheric signal in the main antenna beam. Meanwhile, aircraft, insects, and birds can fly directly through the main antenna beam, producing spectral contamination much stronger than the atmospheric signal.

UHF radars that are used for profiling the wind in the atmosphere must be extremely sensitive in order to detect the very weak backscatter from index-of-refraction fluctuations caused by turbulence in clear air. Ottersten (1969)

showed that the radar reflectivity of clear air is $\eta \approx 0.38 C_n^2 \lambda^{-1/3}$ where $\lambda$ is the radar wavelength and where $C_n^2$ is the refractive index structure function parameter for the atmosphere. Typical values for $C^{2n}$ in the lower troposphere range from $10^{-15}$ to $10^{-13}$ m$^{-2/3}$, although larger values up to $10^{-11}$ m$^{-2/3}$ have been observed (Gossard and Strauch, 1983; Knight and Miller, 1993). Much smaller values are generally observed in the upper atmosphere where the air is drier. Wesely (1976) relates $C_n^2$ to the scalar structure function parameters for temperature and humidity, showing that at microwave frequencies humidity has the greater influence.

The radar return from aircraft, birds, and insects can be much stronger than the radar return from clear-air turbulence. Even though radar observations of birds and insects are not new (Vaughn, 1985), the potential problem for profilers posed by flying objects was perhaps underestimated. However, recently the remote sensing community has come to realize that profiler performance is degraded at times by contamination from migrating birds to a far greater extent than was previously expected (Wilczak et al., 1994). Included in this are all organic fliers, including bats and insects, but it is the large number of migrating birds that has caught the attention of the radar community. The problem is aggravated by smaller antennas with their broad beams and high sidelobe levels. Because of this, the high-frequency boundary-layer radars were the first to draw wide attention to this problem. Then it was realized that the NOAA profilers (404 and 449 MHz) are also very susceptible to interference from bird echoes.

Bird echoes (and echoes from other fliers) can be mistaken for the atmospheric signal, producing spurious measurements with no meteorological information content. Spurious measurements are harmful for two reasons: (1) they can inject misleading information into an application and (2) they prevent meaningful measurements from being made. The occasional isolated flier produces contamination in the Doppler spectra that is sometimes mistaken for atmospheric signal, producing erroneous wind measurements. The erroneous winds can often be identified and removed at later stages of radar signal processing, although that is by no means guaranteed. The contamination is much more serious and widespread with migrating birds, which can reach concentrations of over 100,000 birds crossing a mile-wide front every hour. These migrating birds normally use favorable tail winds and calmer weather conditions to their advantage (Gauthreaux, 1991). As a result, their velocities tend to blend in with surrounding wind velocities, sometimes making the identification of bird-contaminated wind measurements difficult or impossible. Therefore, it is necessary to identify and remove this contamination before the spectral estimation is made.

With Doppler radars, different targets can sometimes be identified by differences in their velocities. However, even when different targets have nearly the same velocities those targets can still be separated based upon their unique scattering properties. Hildebrand and Sekhon (1974) used this principle to identify the system noise in each Doppler spectrum. Noise and atmospheric echoes from rain and the clear air have different Gaussian statistical distributions. Aircraft and bird echoes, on the other hand, are expected to exhibit different statistical distributions altogether.

In typical profiling radars, many Doppler spectra are averaged over some dwell time for every antenna beam and for every range gate. The averaging is intended to improve signal detection by reducing the noise fluctuations in the spectra, i.e., by smoothing the spectra. If some of the spectra are contaminated, then the average spectrum is also contaminated. One way to eliminate the contamination in the average is by editing the data before averaging. An example of this is the conventional consensus averaging used for years to produce hourly winds with profilers. One might be tempted to use a consensus average or a median estimator rather than a simple average on the spectra, and the inventor did, in fact, use a median estimator with some success. The problem with both the median and the consensus methods, however, is that they depend upon the desired data constituting a majority of the data with the contamination being in the minority.

SUMMARY OF THE INVENTION

It is an object of the invention to provide a spectral estimating method for use in Doppler radar signal processing which identifies and separates different target signals before the average spectral estimate is made.

It is a further object of the invention to provide a method which does not rely upon the contamination being a relatively rare phenomenon.

It is a further object of the invention to provide a method which works even when, as is often the case particularly with migrating birds, strong bird echoes dominate the much weaker atmospheric signals and contaminate a large fraction of the spectra measured during the dwell time.

To achieve these and other objects, the invention is directed to a method which assumes only that the radar dwells on a particular volume of atmosphere long enough for the atmosphere to be observed without corruption part of the time. Then some (perhaps only a small fraction) of the spectra will have atmospheric signal uncontaminated by birds. The method according to the present invention looks for the weakest Gaussian distributed signal in each Doppler bin for every antenna beam and for every range gate. A Doppler bin is associated with a velocity or frequency in the periodograms produced using an FFT (Fast Fourier Transform) or some other spectral estimator. Because this new method uses statistics to selectively average the data in each sample bin (Doppler/range/antenna beam), it is referred hereinafter as the Statistical Averaging Method (SAM).

BRIEF DESCRIPTION OF THE DRAWINGS

The invention will now be described in detail with respect to the drawings, in which.

DETAILED DESCRIPTION OF THE PREFERRED EMBODIMENT

Figure 1:
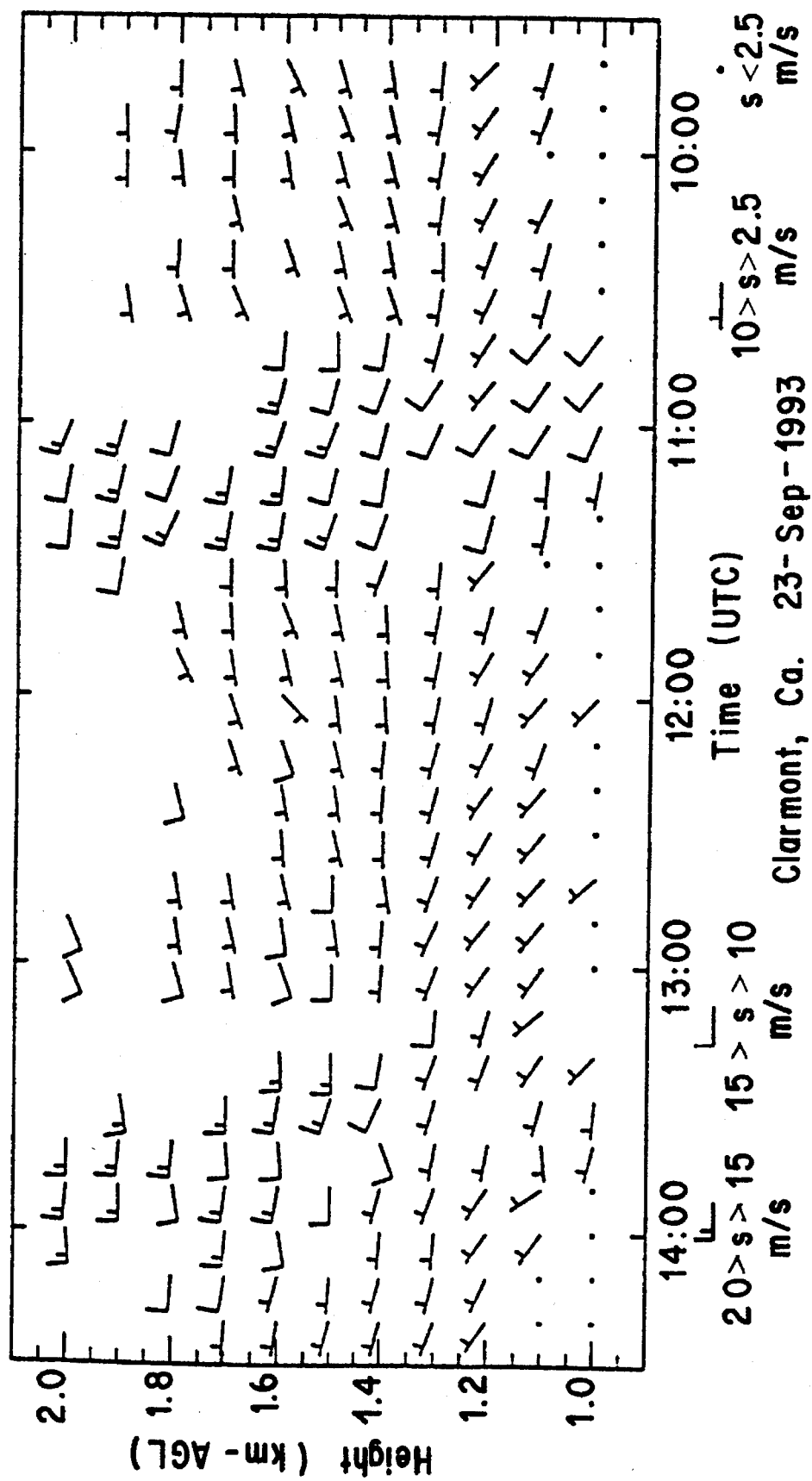
FIG. 1 shows a chart of wind speeds measured in Claremont, Calif.

An algorithm based upon SAM was tested during the fall migration at Claremont, Calif., just east of Los Angeles. FIG. 1 demonstrates the serious problem created for profilers by migrating birds. This figure illustrates the wind measurements early one morning late in September when the birds had a favorable tail wind. Note the stronger apparent winds between 1045 and 1145 UTC (between 2:45 and 3:45 A.M. local time) and between 1315 and 1415 UTC. During these periods, standard averaging of spectra was performed. At other times the new SAM was used, giving the smaller, and more reasonable, estimates of wind velocities. The apparent stronger winds are incorrect; they represent the velocities of the birds whose spectral signals dominated the weaker clear-air radar return. Existing signal processing detects the strongest signals present in the Doppler spectra. It could be determined that birds were present during the time period because the video output of the radar receiver was continually monitored with an A-scope, which revealed continuous heavy bird traffic.

Figure 2B:
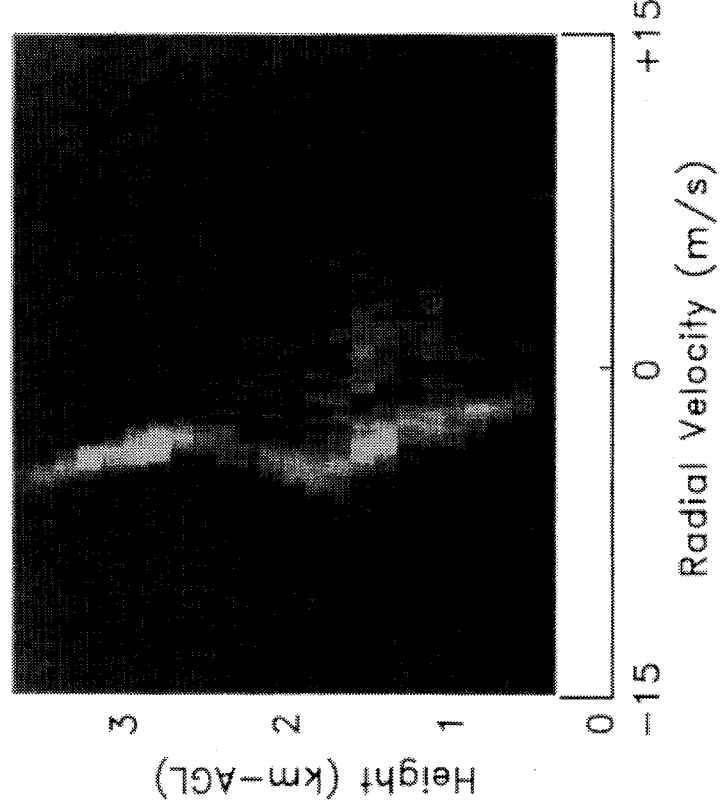
FIGS. 2A and 2B show two charts of radar signal power measured at White Sands Missile Range, N. Mex.
Figure 2A:
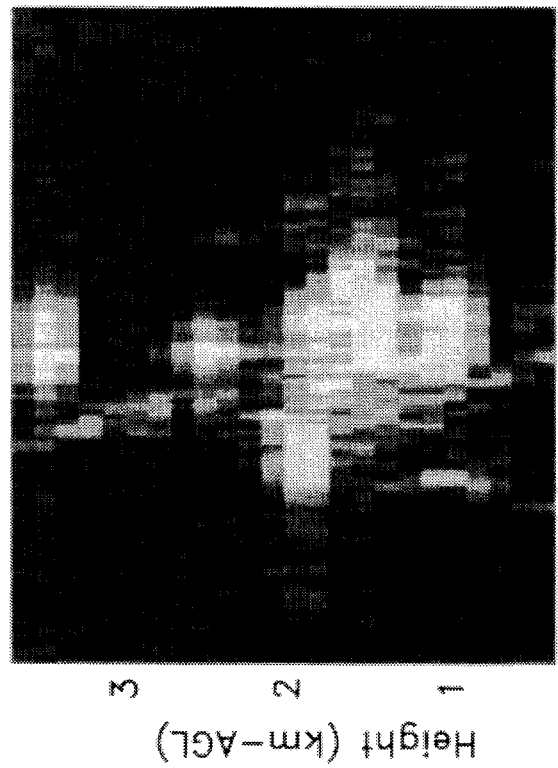
Figure 2C:
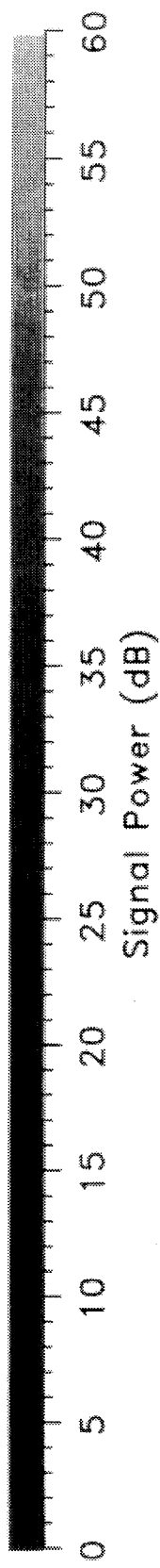
FIG. 2C shows a scale of signal power used in FIGS. 2A and 2B.

FIGS. 2A and 2B illustrate the performance of SAM, using Doppler spectra collected on one antenna beam with the 404-MHz profiler radar at the White Sands Missile Range, N. Mex. during the spring migration of birds. FIGS. 2A and 2B use a scale of signal power shown in FIG. 2C. FIG. 2A shows the average Doppler spectra over all range gates using a simple average of all available spectra. The background noise shows as generally darker gray while the much stronger radar return from birds shows as light gray and white. FIG. 2B shows the Doppler spectra obtained using SAM with the same spectra used to produce the graph on the left. The nearly vertical light gray and white line is the clear-air return from the atmosphere, which is impossible to discern in the simple average. Note the residual bird echo, which appears as light gray to the right of the atmospheric return, primarily at the low- to mid-altitudes. This residual bird echo may possibly be reduced with another implementation of SAM. The dwell time used to collect these spectra was about 2 minutes because of the special configuration required to operate this radar, which is part of the NOAA Profiler Demonstration Network. Profilers in this network do not normally collect all spectra.

FIGS. 1, 2A and 2B demonstrate that it is possible to reduce or eliminate the contamination from unwanted targets such as birds using alternative spectral averaging schemes. In this application we present an analysis of a computer algorithm for SAM. It should be kept in mind that SAM is a very general method for spectral averaging and not just a method for removing bird contamination from radar Doppler spectra. In fact, this method can provide useful atmospheric measurements while possibly also providing bird monitoring. The radar would no doubt have to be calibrated for the latter to be useful.

Figure 3:
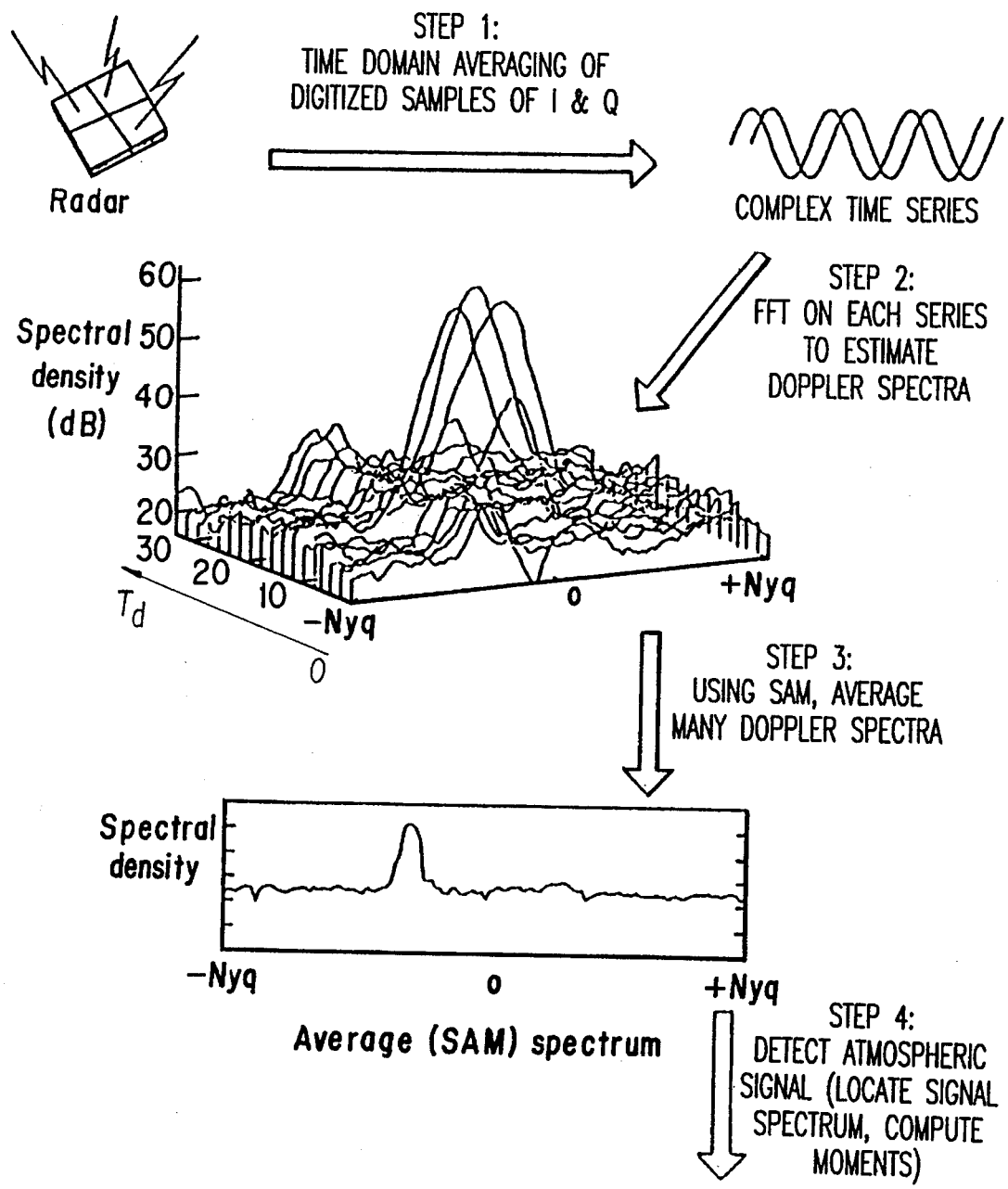
FIG. 3 shows a data processing flow diagram for profilers.

For purposes of describing the present embodiment, four steps in the profiler radar signal processing will be considered (FIG. 3). Step 1 in signal processing is the coherent averaging over time of the digitized samples at the video output of the radar receiver for the in-phase (I) and the quadrature (Q) channels at many range gates on several different antenna beams. However, for purposes of this discussion, a single range gate and just one antenna beam will be considered. In Step 2, many of these coherently averaged samples are used to estimate Doppler spectra (shown for a single range gate with a total dwell time $T_d$). Step 3 is where the method discussed in this application is used to incoherently average many Doppler spectra using the Statistical Averaging Method. Finally, in Step 4 the atmospheric signal is detected in the averaged Doppler spectrum and its moments are computed, giving the radial velocity of the wind. The first two steps involve coherent processing that improves the signal-to-noise ratio (SNR); however, the total coherent integration time is limited by the correlation time for atmospheric turbulence (Nathanson 1969). The third step uses an incoherent process that smooths the spectra, improving the detectability of weak atmospheric signals without changing the SNR. The SAM presented here can eliminate some stronger radar returns, for example, from birds, that can mask the atmospheric signal. The fourth step can thereby produce more reliable wind measurements. We shall concentrate upon Step 3, although all steps affect the total dwell time of the radar, which as we shall see is most important in determining the effectiveness of SAM.

With existing profiler radars, an averaged spectral estimate is produced in Step 3 by simply summing all spectral values in each Doppler bin. With SAM, the averaging includes only a subset of the values in each Doppler bin. Then, the averaged spectral estimate is $$\hat{S}_n^{M_n} \stackrel{def}{=} \frac{1}{M_n} \sum_{m=0}^{M_n-1} \hat{S}_{mn} \qquad (1)$$

where $\hat{S}_{mn}$ represents the $m^{th}$ spectral estimate in the $n^{th}$ Doppler bin. The index $m=0 \ldots M-1$, where M is the total number of spectra collected over some dwell time. The index $n=0 \ldots N-1$, where N is the size of the Fast Fourier Transform (FFT) used to compute a spectrum.

The number of average spectra $M_n \leq M$ is in general different for each Doppler bin n. With the simple average commonly used now, the number of averages $M_n=M$ is the same for all Doppler bins. It is implied in formula (1) that the spectral estimates in each Doppler bin n have been sorted in ascending order according to their strength. That is, $\hat{S}_{mn} \leq \hat{S}_{m+1n}$, where the ordering is done independently for each Doppler bin. Normally, the spectral estimates enter the summation (1) in chronological order (the order in which they were sampled). Thus, the order will in general be different in every Doppler bin. This ordering is necessary for the statistical tests used in SAM to discriminate different radar signals. Hildebrand and Sekhon (1974) ordered across Doppler bins in the averaged spectra to discriminate the system noise from radar signals.

With the first implementations of the Statistical Averaging Method, a Gaussian statistical test like that of Hildebrand and Sekhon (1974) was employed because it is reasonable both for radar system noise and for atmospheric radar return. Actually, the I and Q time series are assumed to be Gaussian distributed for noise and atmosphere. The power, as measured by the spectral estimates, must therefore be exponentially distributed. Hence, the Hildebrand and Sekhon test is for an exponential distribution of the spectral estimates. This statistical test is a necessary condition, but it is not a sufficient condition. For any process exhibiting Gaussian or exponential statistics, all higher-order moments are expressed in terms of the lowest moment. Thus, any test like the Hildebrand and Sekhon test is incomplete because it relates only the first and second moments; a complete statistical test would test the distribution. Then, the Hildebrand and Sekhon test and SAM actually attempt to detect the presence of multiple signals by detecting their different statistics, the actual distributions being of secondary importance. It is assumed that fliers such as birds have signals with statistical distributions different from those of signals for noise and the atmosphere.

Following Hildebrand and Sekhon (1974), a first implementation of SAM employed the test, $$\frac{\text{var}(\hat{S}_n|M_n)}{(\hat{S}_n^{M_n})^2} \leq 1 \quad (2)$$

where the variance and the mean computations (1) use the same subset of $M_n$. It is assumed that radar system noise and clear-air return from the atmosphere are in general weaker than bird echoes. Thus, only the $M_n$ weakest signals in each Doppler bin satisfying this test (2) are identified with noise or atmosphere. The stronger spectral estimates with a different statistic are assumed to belong to fliers like birds.

Figure 4:
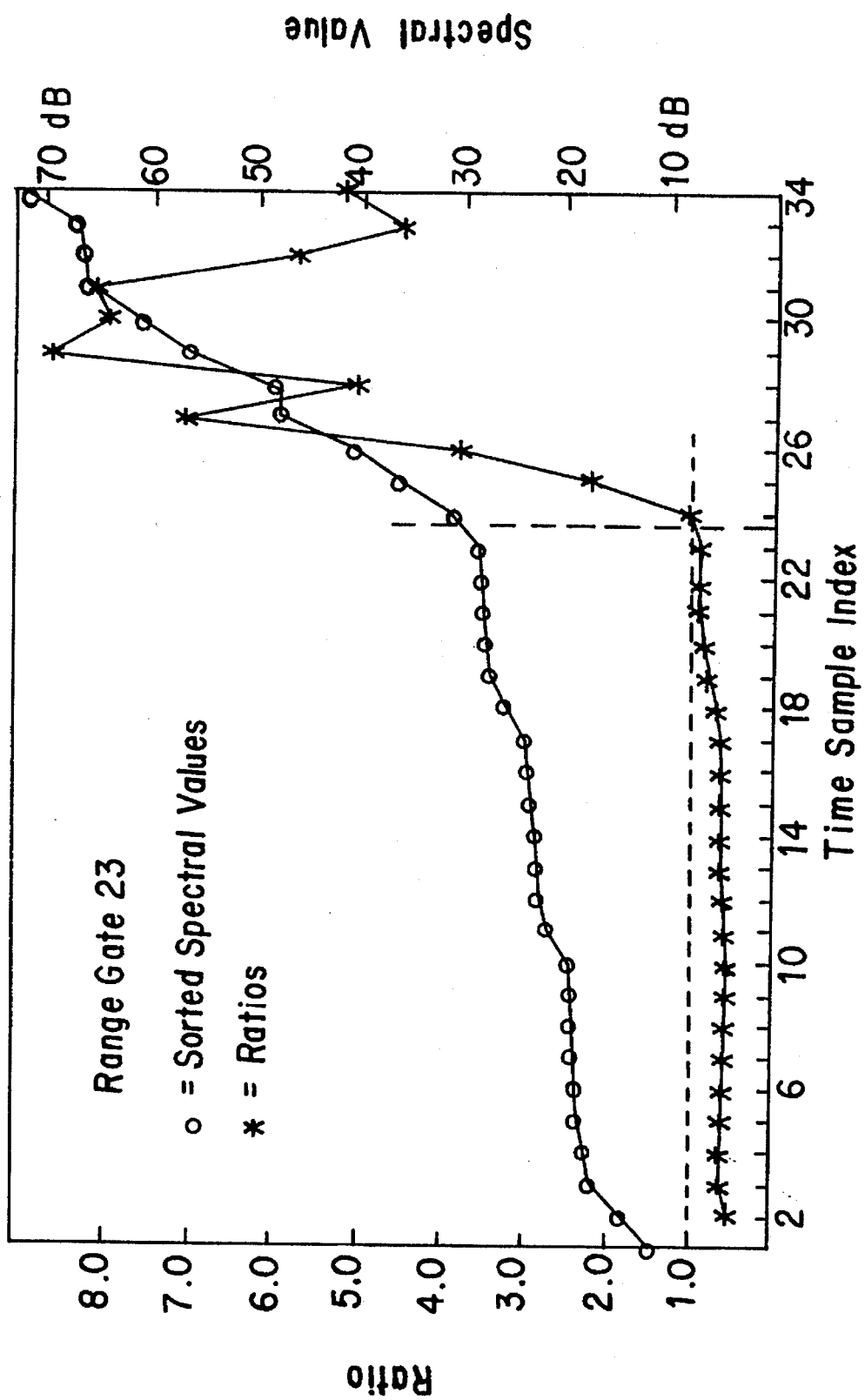
FIG. 4 shows a graph of ordered power for the spectra used to produce an average spectral value.

FIG. 4 illustrates how SAM works for a single Doppler bin (and in a single range gate). A total of 34 spectral values are sorted in ascending order. Then a running summation (1) is computed, starting with the weakest spectral value, until the condition (2) is met. In FIG. 4 this condition is met between ordered spectral values 23 and 24. The variance is less than the square of the mean when any number of points from 1 to 23 are included in the summation (1). The variance is greater than the square of the mean when any number of points from 24 to 34 are also included in the summation.

Figure 5:
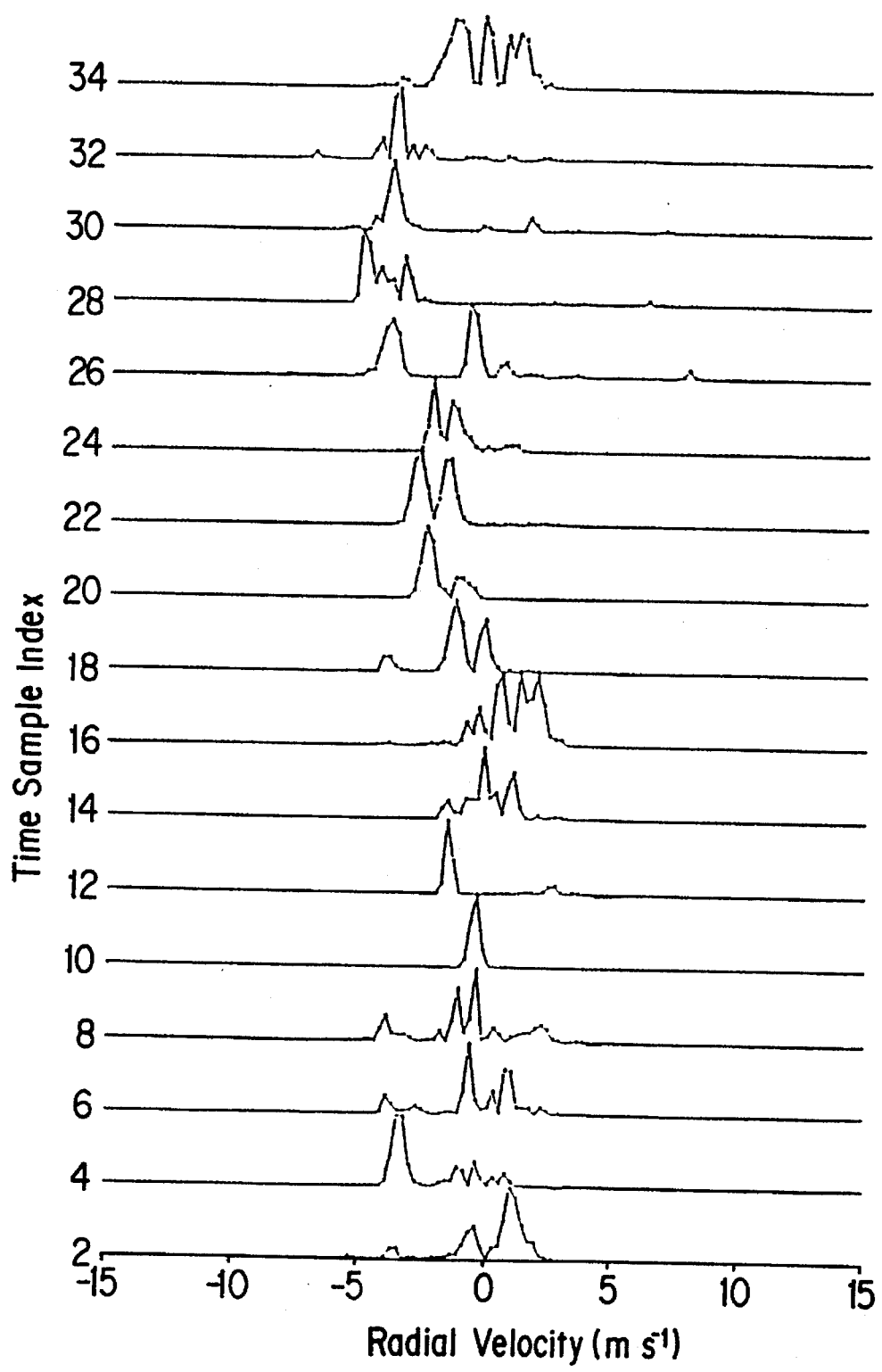
FIG. 5 shows unaveraged Doppler spectra for the radar signal power of FIG. 2.
Figure 6:
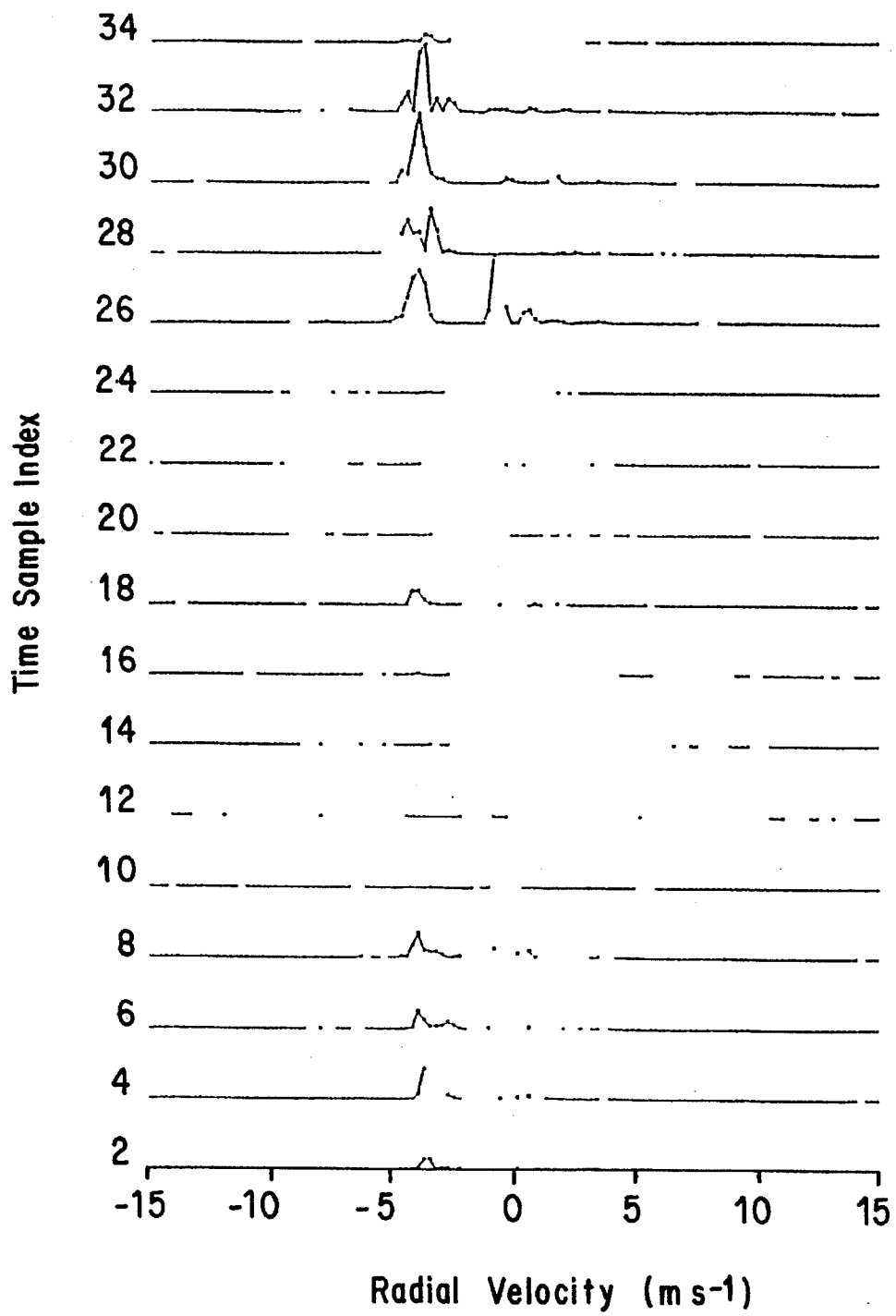
FIGS. 6 and 7 show Doppler spectra after SAM; that is, after removal of contamination.

FIG. 5 shows every other spectrum (of the 34 in time) that contributed to the average spectrum of the eighth range gate in FIG. 2A. FIG. 6 shows what parts of those spectra are included (by SAM) to produce the spectrum of the same range gate in FIG. 2B. The spectra in both FIGS. 5 and 6 are shown on the same scales where each spectrum in time is scaled independently. The missing parts of the spectra in FIG. 6 were identified by SAM using test (2) as having either non-Gaussian statistical distributions, or a different Gaussian distribution. The results are not perfect, but most of the bird contamination is removed with minimal loss of atmospheric signal. Further development in SAM as well as better data sampling could improve upon these already impressive results.

Figure 7:
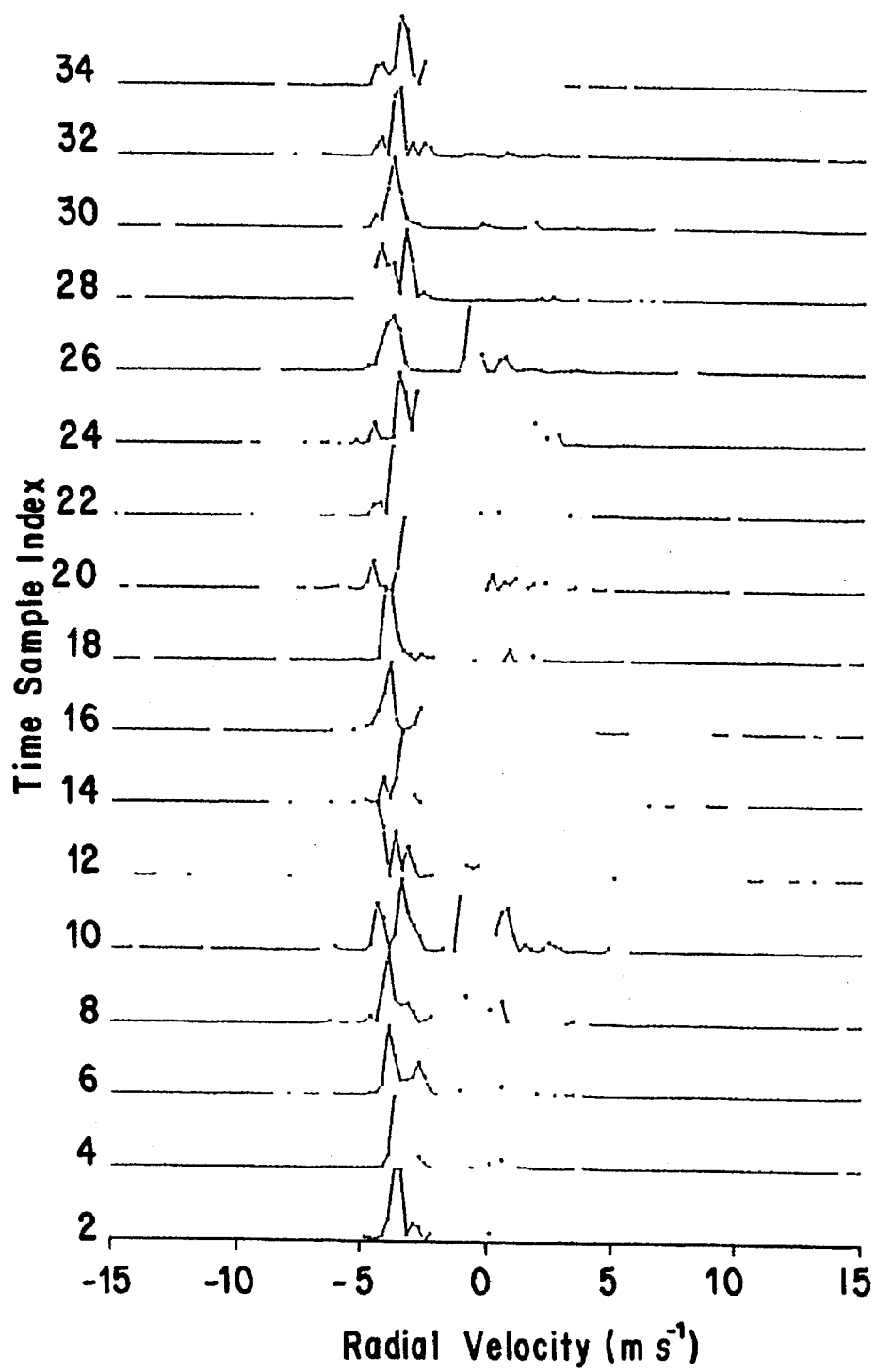

Most of the peaks in FIG. 6 are associated with atmospheric return. Most of the bird contamination, which dominates FIG. 5, has been eliminated. The peak to the left in time sample 26 is atmospheric, but the energy to the right is bird contamination that leaked through. Improvements in the new algorithm should reduce this leakage still further. On the other hand, SAM worked fairly well in the middle time samples, where the bird contamination was strongest. The atmospheric signals at those times can be seen by rescaling (FIG. 7). Note that some bird contamination also leaked through here, but overall SAM did retain most of the atmospheric signal while removing most of the bird interference.

There are three very important points to be made. The first point is this: According to the central limit theorem, system noise, and signals from clear-air, precipitation, and clouds all have Gaussian signals because all consist of large numbers of sources. Therefore, the Statistical Averaging Method by itself cannot unambiguously identify the source of the spectral signal. However, system noise is generally the weakest signal, and clear-air return is the next weakest signal in useful spectra. Furthermore, a spectral averaging scheme is desired that yields noise in all Doppler bins except those in which the atmospheric signal dominates. It is desirable to discriminate the spurious returns of fliers such as birds from atmospheric signals and radar system noise.

The second point is this: The singular test (2) is insufficient to ensure Gaussian statistics. Higher order statistical moments should also be tested to eliminate other non-Gaussian distributed signals. However, the Statistical Averaging Method is not limited to this test (2), which is used here only for purposes of demonstration.

The third point is that the Statistical Averaging Method cannot be expected to produce the desired results without representative statistics. That is, the radar sampling strategy is critical to providing adequate statistics. In particular, the dwell time for producing an average spectrum on each antenna beam must be sufficiently long to ensure that, for some fraction of the dwell, contamination is not present. In addition, more sophisticated spectral processing must be used to correctly identify weak atmospheric signal in those case when even low levels of contamination leakage still produce the strongest signal in a spectrum. The present method of selecting the highest peak will not do.

All fliers pose potential problems for profilers because their radar echoes can be much stronger than the weak radar return from clear-air turbulence, obscuring the atmospheric signal. Contamination from birds is more severe at higher radar frequencies because the reflectivity of a flier is proportional to $\lambda^{-4}$ for targets that are small compared with the radar wavelength $\lambda$. Contamination is also more serious for radars with smaller antennas because their larger beamwidths allow fliers to be observed for longer periods. Isolated fliers are not so much of a problem even when they persist in the spectral average because they will usually not persist for more than one dwell period. However, masses of fliers such as migrating birds pose a more serious challenge because they can introduce contamination simultaneously in several range cells and continuously for hours. If the density of fliers is large enough, there will always be one or more fliers within the radar sample volume. With a typical density of $10^{-6}$ songbirds per $m^3$ (Vaughn 1985), there will be on average about three individuals at any given time in the sample boundary-layer profiler, whose smaller antenna has a larger beamwidth. While it is true that the radar is less sensitive to fliers outside the main antenna beam, a flier's return in a sidelobe can also dominate the atmospheric return in the main lobe because the reflectivity of the clear air is so weak. In addition to being relatively strong, the Doppler radar signature of an individual migrating songbird contains wingbeat structure (Wilczak et al, 1994) on the main body velocity spectrum. But, for long averaging times the spectrum is broadened, and the wingbeat signature is not observed.

Fliers such as birds exhibit very different statistical properties from those of the atmosphere. For example, the Doppler velocity of the atmospheric signal is expected to be stationary over periods of a few minutes, except under extreme conditions when the profiler is not expected to produce meaningful winds. The Doppler velocity of the return from a flier such as a bird, on the other hand, may change considerably over a minute or so. Also, the atmosphere's signal amplitude fluctuates from one spectrum to the next, but its average power is expected to be stationary except under conditions (such as those in convection) when the profiler may not produce meaningful measurements. However, a bird's return strength in any given Doppler bin changes as the bird passes through different parts of the radar's antenna beam pattern and as its range from the radar changes. Clearly, these changes should be significant over shorter time periods when the antenna beam is narrower and when the range gates are smaller.

Any statistical method like SAM relies upon the probability that the contamination from the fliers will not always be present in the same Doppler bin/range gate over the entire dwell time on any given antenna. Then, the atmosphere or system noise must be observable for at least part of the dwell period. The chances of this happening obviously depend upon the behavior and concentration of the fliers, but it also depends upon radar parameters affecting the sampling. For example, longer dwell times or averaging times would seem to offer better performance with the new method because the fliers have more time to move through Doppler bins and/or range gates. The atmospheric signal, on the other hand, should remain in the same Doppler bin unless the dwell time is so long that wind changes become important.

Up to a point, longer dwells improve observations of the atmosphere in the absence of contamination. Chadwick et al. (1984) and Moran et al. (1989) show that radar sensitivity to atmospheric signals improves with greater transmitted power, with larger antenna aperture, and with longer dwell times. Strauch et al. (1984) show that the longer dwell times improve sensitivity by increasing the SNR in the Doppler spectra. The SNR increases with longer coherent processing times T approaching but less than the correlation time $\tau_c$ for atmospheric turbulence (Nathanson 1969). That is, $$T < \tau_c \sim 0.2 \lambda \qquad (3)$$

where $\lambda$ is the radar wavelength in meters. For boundary-layer profilers with $\lambda \sim 0.3$ m, the correlation time $\tau_c$ is about 0.06 seconds. As long as these physical units are used, Eq. (3) is dimensionally correct because other units have been included in the proportionality constant.

The coherent processing time T (3) includes time domain averaging over the time period $\tau = N_c \tau_p$, where $N_c$ equals the number of time domain samples average in the I and Q channels (typically a few hundred), and $\tau_p$ is the time between transmitted pulses (typically about 50 μs). Also included in the coherent processing time is the spectral process with N (typically 64 or 128) time samples at the interval $\tau$. Hence, $T = N\tau = NN_c\tau_p$, which is restricted by the condition (3). Coherent processing longer than this time (3) does not improve the SNR for the atmospheric signal, but it may improve the detectability or the effective SNR. The time domain averaging period T determines the unambiguous (or Nyquist) velocity for the Doppler spectra, $V_N = \lambda/4\tau$. Any velocities greater than this are aliased, creating ambiguous wind measurements. Therefore, $\tau$ is selected in order to achieve a Nyquist velocity to measure horizontal winds with minimal ambiguity. Up to a point, larger spectral bandwidth along with better spectral resolution (larger N) may improve chances of separating fliers from atmospheric return when their Doppler velocities are different. The total coherent time interval T determines Doppler velocity resolution, $\Delta V = \lambda/2T$. Of course, increasing the size of the FFT increases the computational load on the radar processor, but with modern digital signal processors, this does not present a practical problem. Therefore, the coherent sample time $\tau$ can be kept small enough to give a large Nyquist velocity (5), and the number of points in the spectrum N can be kept large enough to give a reasonable velocity resolution.

The last step in signal processing which will be described here is the spectral averaging. There are M spectra included in the averaging process (1) even if only $M_n \leq M$ are used to compute the average value in any given Doppler bin n. Then, the dwell time is $$T_d = MT = MN\tau \qquad (4)$$

This dwell time is an important parameter affecting the performance of the new method. The radar must dwell on each antenna beam long enough to allow moving targets sufficient time for their signals to change Doppler bins, angular position, and/or range gates. Therefore, a conservative approach would be to use the largest possible radar dwell time, say greater than a minute, assuming that the processor can handle the increased load. It is assumed that the winds do not change significantly over the dwell time. Therefore, this dwell time must be kept small enough to capture the desired changes in the atmosphere but long enough to discriminate fliers. Dwells of a few minutes at most seem acceptable when profilers have been used for years to produce hourly averaged winds.

The rate at which a moving target changes its Doppler velocity is given by the time rate of change in the radial velocity or by the radial acceleration, $$a_r = \frac{dv_r}{dt} = -\left( \frac{dv}{dt} \cdot \hat{r} + \frac{v^2 - v_r^2}{r} \right) \qquad (5)$$

where the radial velocity $v_r = -v \cdot \hat{r}$, also the Doppler velocity, is positive for targets approaching the radar. The flier's instantaneous speed is v and its instantaneous velocity is v. The negative sign preceding the parenthetical expression is necessary because the unit magnitude radial vector $\hat{r}$ is positive directed away from the radar. The first term gives the change in radial velocity due to the radial component of the flier's acceleration or maneuvering. The second term on the righthand side in (5) gives the radial velocity change due to changes in the angular position of the flier relative to the radar. Therefore, even if the flier is not accelerating (i.e., its velocity v is constant), the radial velocity changes according to the second term in (5) because the flier's angular position changes.

Figure 8:
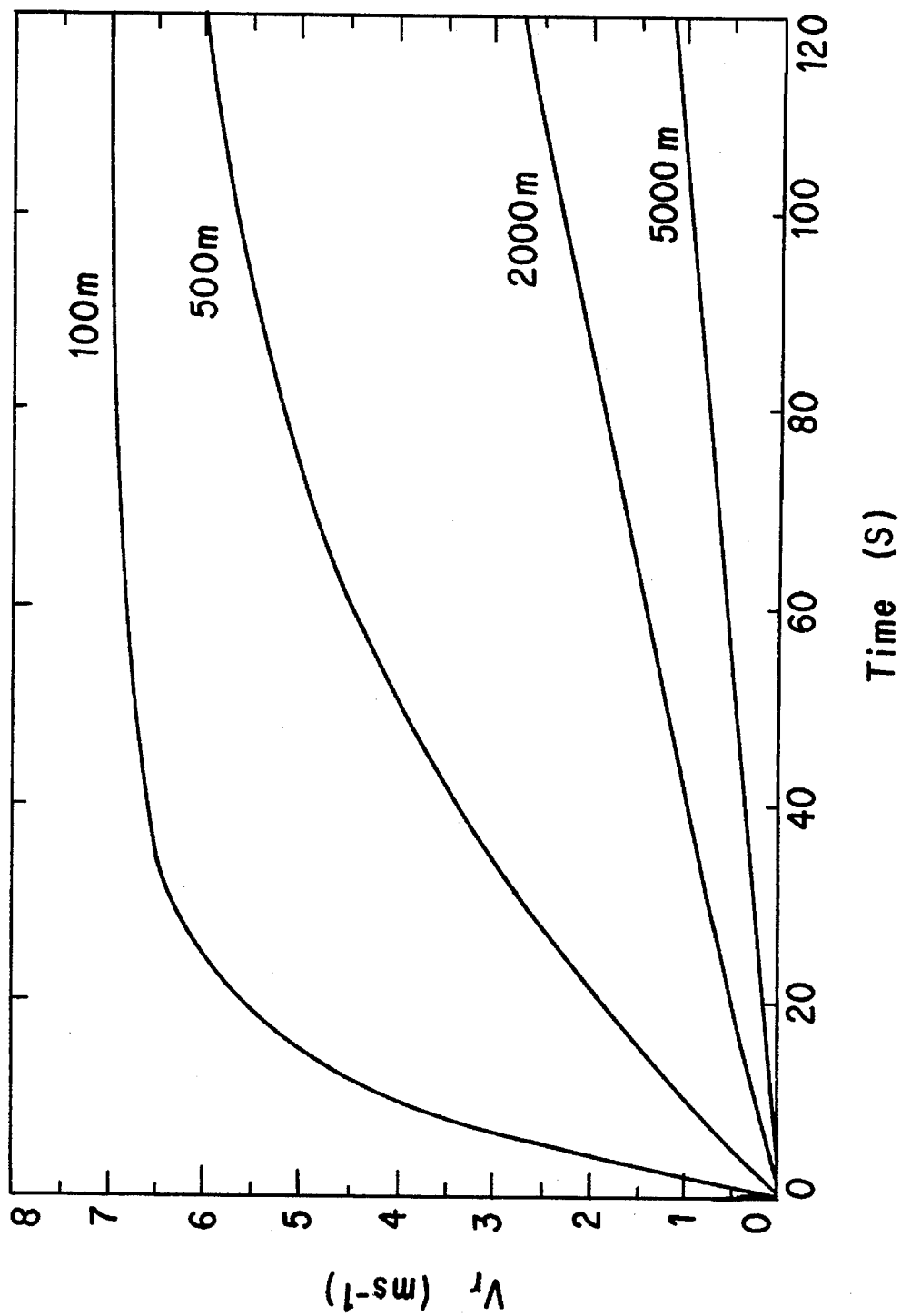
FIG. 8 shows radial velocity as a function of time for a target in uniform horizontal flight.

If the target is moving radially toward or away from the radar in horizontal flight at a fixed altitude, then the radial velocity is $v_r = v \sin \theta$ and the radial acceleration is $a_r = v^2 \cos^2 \theta / r$, where $\theta$ is the angular position of the target from the vertical. FIG. 8 shows the radial velocity of a target in horizontal motion with a speed of 7 m s$^{-1}$ (typical for some migrating birds) at four different elevations. As expected, targets at lower altitudes change radial velocities much more quickly than those at higher altitude targets. At 2 km or higher, the Doppler velocity does not change significantly over even one minute dwells and, thus, SAM is clearly going to be less effective for birds flying at those altitudes. If we assume that the radial acceleration $a_r$ (5) does not change much during the radar dwell $T_d$, then the change in radial velocity is approximated by $\Delta v_r \sim a_r T_d \sim v^2 \cos^2 \theta \, T_d/r$. This linear dependence upon dwell is valid only for shorter dwells at the lower altitudes (FIG. 8). At some point, longer dwells do not have much effect upon the change in Doppler. The Doppler change is important if it is larger than the Doppler resolution $\Delta V$. Thus, spectra with better resolution (i.e., with longer coherent times T (3)) may improve the performance of SAM even though they will not improve the signal-to-noise ratio.

For a migrating bird flying horizontally with uniform speed, the radial velocity change is entirely due to angular position change. In addition, changes in the flier's angular position in the radar antenna pattern alter its radar return, causing the flier's spectral signal energy to vary. Large variations allow the Statistical Averaging Method to exclude the flier from the spectral average. The lowest flying targets change their angular positions most rapidly as expected, with the change in the flier's angular position being $\Delta\theta \sim v \cos \theta \, T_d/r$. Again the linear dependence upon dwell is valid only for shorter dwells at lower altitudes. The angle changes are significant when they are large compared with the radar antenna beamwidth, typically 10° for boundary-layer profilers. Thus, it is obvious that radars with narrower antenna beams may benefit more with methods like SAM than will radars with larger antenna beams. The boundary-layer profilers, with their smaller, less expensive antennas, are most at risk because their measurements concentrate in the lower troposphere where birds are most abundant. Finally, if birds and other moving targets change their range from the radar over the dwell period, then background noise and atmospheric return can be observed without contamination at least part of the time. For a flier in uniform horizontal flight, the range change can be estimated by $\Delta r \sim v_r T_d \sim v \sin \theta\, T_d$. The range change is significant when it is large compared with the radar range resolution $\Delta R$. Obviously, better range resolution combined with longer dwell times improves the chances of success with the new method.

When the changes in radial velocity, angle, and range are considered, it seems clear that in general a flier's spectral signal will not have exactly the same Doppler as the atmospheric signal. However, these two signals are not confined to single Doppler bins. Therefore, the two signals can be resolved only if two separate spectral peaks can be identified. That is, the atmospheric signal is detectable if the flier has less radar reflectivity than the atmosphere where the latter peaks in the spectrum. This condition is met if the radar dwell $T_d$ satisfies the following constraint:

$$2\sigma^2 \ln\left(\frac{\eta\sigma_0}{\eta_0\sigma}\right) < (v-v_0)^2 \sin^2\theta_0 + \left(v^2\cos^2\theta_0 + \frac{\ln 2\sigma^2}{\Delta\theta^2}\right)\frac{v^2\cos^2\theta_0}{r^2} T_d^2 + 2v(v-v_0)\sin\theta_0\cos\theta_0\frac{v\cos\theta_0}{r} T_d \quad (6)$$

when $\eta$ is the reflectivity of the flier moving with a constant horizontal speed of $v$, $\eta_0$ is the reflectivity of the atmosphere at the center of the antenna beam directed at $\theta_0$, and the horizontal wind speed is $v_0$. In deriving this result, it is assumed that the bird speed and wind speed were directed at the radar in this antenna beam. That is, there is no azimuthal motion. Also, it is assumed that the radar's antenna pattern is Gaussian with rms width $\Delta\theta$, that the atmospheric signal has a Gaussian shape with an rms width of $\sigma_0$, and the flier signal has a Gaussian shape with a width of $\sigma$. Furthermore, it is assumed that during the radar dwell time Doppler separation of the atmospheric and flier signals is achieved. That Doppler separation is given by $$v_r - v_{0r} \sim (v-v_0)\sin\theta_0 + v\cos\theta_0\,(\theta-\theta_0),$$

where the angular separation is $\theta-\theta_0$, and when the angular distance off vertical for the flier is $\theta$. Also, $v_{0r}$ and $v_r$ are the radial velocities for the wind and the flier, respectively.

This condition (6) is satisfied for sufficiently long dwell times $T_d$, which can be shorter for larger flier speeds $v$ and for smaller antenna beamwidths $\Delta\theta$. Obviously, the dwell time must be greater when the reflectivity of the flier $\eta$ is much larger than the reflectivity of the atmosphere $\eta_o$, although the effect of reflectivity on dwell time is only logarithmic. The reflectivity of a flier is a function of the geometrical and the electrical properties of that flier, but the detailed scattering cross section of various fliers will not be discussed here. For the purposes of this discussion, the reflectivity $\eta$ in (6) is considered to be the flier's reflectivity when it is at the center of the main antenna beam. The atmospheric reflectivity $\eta_0$ is that for the main antenna beam, although the atmosphere produces return in all parts of the antenna pattern. However, the return in the main beam is assumed to dominate that from sidelobes. An exception arises when clear air is observed in the main antenna beam while precipitation is observed in an antenna sidelobe during convective storm activity.

Figure 9:
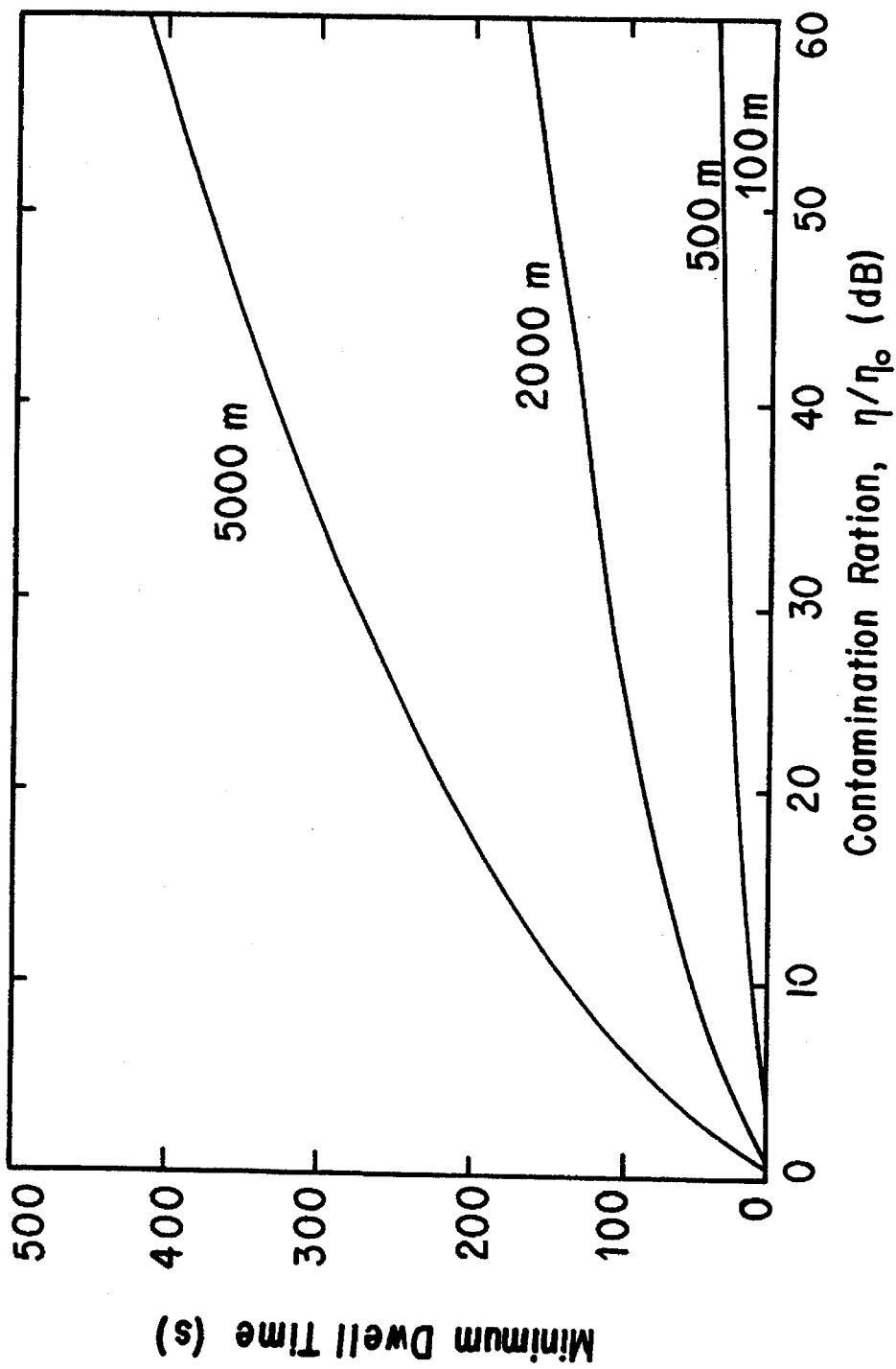
FIG. 9 shows the minimum dwell time necessary to resolve spectral signals for the atmosphere and a target in uniform horizontal motion.

FIG. 9 illustrates the minimum dwell time prescribed by (6) as a function of contamination. The minimum dwell times are indicated in the tens of seconds at the lower altitudes, but at the upper altitudes several minutes of dwell might be required for heavy contamination. It is important to keep in mind that these results merely indicate the minimum dwells necessary for the target to change significantly its Doppler velocity, its angular position, and/or its range from the radar. These changes cause the target's radar signature to change such that SAM (or some other method) can discriminate it from non-changing returns from the atmosphere.

Even if this condition (6) is met, there is no guarantee that the atmospheric signal will always be identified. Existing algorithms that choose the strongest signal will still mistake the stronger flier echo for atmosphere. This condition (6) simply states a necessary condition, not a sufficient condition. If the atmospheric signal is stronger than the flier signal, then condition (6) will be true and an algorithm that picks the strongest signal will correctly identify the atmospheric signal. On the other hand, even when the atmospheric signal dominates, the spectral moment computations can still be contaminated. If the flier signal overlaps the atmospheric signal, then some of the fliers energy will be included in the moment computations, producing biases in the wind measurements. Therefore, the requirement (6) does not imply that flier contamination is eliminated. It is only a requirement for detection of the atmospheric signal. Existing spectral processing algorithms used for profiling would still be insufficient for making measurements uncorrupted by contamination from birds and other fliers.

Migrating birds in uniform flight or cruising aircraft will always present changing Doppler velocities and changing rates. It appears that increasing dwell times to over a minute should improve the performance of methods like SAM for removing flier contamination from atmospheric signals. Observations to date (e.g., FIGS. 1, 2A and 2B) demonstrate that radar contamination from migrating birds is effectively reduced using somewhat longer dwells (1–2 minutes) than have been traditionally used (i.e., 20–30 seconds). Naturally, uncooperative targets that linger in any given Doppler bin and range gate for the entire dwell time cannot be removed by this method. Other methods are needed (Weber et al., 1993).

A subject not considered here is that of algorithms for target identification and moment computations. Currently, most profilers use automatic processing in which the strongest signals in most spectra are attributed to the atmosphere. Experience has shown that this process cannot be reliably used in the presence of contamination from fliers or ground clutter. We have developed and are now testing methods for target identification that test the consistency of radar signals over range, over time, and over antenna beams. Convection and other conditions producing meteorological variability across the antenna beams are detected by checking consistency of Doppler across four or five antenna beams. Precipitation is detected in part based upon the vertical fall speed and the reflectivity. Thus, methods like SAM are not the complete story in reducing contamination in profiler measurements.

Contamination by birds of wind data reported by profilers is now a demonstrated fact. This contamination has been observed by many different investigators using boundary-layer profilers and other profilers that probe the upper atmosphere (e.g., the NOAA Network profilers). Birds (and other fliers) will contaminate radar data when they are present in the antenna beam because they have reflectivities stronger than the atmosphere. Therefore, the solution to this problem lies with new signal processing methods designed to improve detectability of weaker atmospheric signals in the presence of birds, aircraft, ground clutter, and sea clutter for coastal operations.

The Statistical Averaging Method presented here shows that profilers may be able to operate in harmony with migrating birds and other contamination sources. FIG. 1 shows winds reported with a boundary-layer profiler during the nighttime just east of Los Angeles when birds were migrating south in September with tail winds along the San Gabriel mountains. The radar was set up to alternate between using simple averaging of spectra and the new method, SAM. The dwell time was about 80 seconds in both cases. This example shows that had we used the standard profiler signal processing, winds would have been reported erring significantly on the high side. FIGS. 2A and 2B show another example of bird contamination, this time at White Sands Missile Range using a NOAA Network profiler radar during the spring bird migration. Again SAM removed most of the bird contamination. There are numerous other examples (not shown here) where SAM successfully removed contamination from migrating birds along the Front Range in Colorado and near the Gulf Coast in Texas.

The analysis presented here demonstrates how alternative methods of computing average radar Doppler spectra can eliminate some signal contamination presented by fliers such as migrating birds. The SAM type of approach uses longer radar dwell times to advantage in order to discriminate fliers from atmosphere based upon their different scattering properties. It is clear from the simple analysis presented here that we have made some major advances. However, because of the ubiquitous nature of birds and other fliers, it is in the interest of both the radar community and the ornithologists to cooperate in gaining a more thorough and detailed understanding of bird behavior. Further improvements in radar performance should not depend upon anecdotal evidence from a few scattered tests here and there, because profilers themselves are becoming ubiquitous. The growing demand and recognized need for reliable remote sensors of the atmosphere may provide ornithologists with a windfall. Our noise becomes their signal.

In this application, I have disclosed a specific embodiment of the Statistical Averaging Method according to the invention. However, the invention is to be limited only by the following claims, not by any specific embodiment. Those skilled in the art who have reviewed this application will be able to derive other embodiments without departing from the claimed invention.

I claim:

1. A method for Doppler spectral averaging, the method comprising:
   (a) collecting a statistical sample set for each Doppler velocity, antenna beam, and radar range using radar Doppler spectral values sampled over time;
   (b) detecting multiple signal sources in said radar Doppler spectral values by using differences in statistical and physical properties of said radar Doppler spectral values;
   (c) separating signals from said multiple signal sources over time, over Doppler velocity, and over radar range;
   (d) identifying contamination in said radar Doppler spectral values using said statistical and physical properties;
   (e) eliminating said contamination, leaving atmospheric signal and radar system noise when these are observable;
   (f) identifying said atmospheric signal based upon said statistical properties and physical properties;
   (g) estimating an average spectrum using a subset of said samples identified with said atmospheric signal and with said radar system noise; and
   (h) indicating a presence of useful signal from said radar Doppler spectral values in accordance with said average spectrum.

2. A method as in claim 1, wherein at least some of said radar Doppler spectral values are in a contain Doppler bin.

3. A method as in claim 1, wherein the radar Doppler spectral values are obtained through fast Fourier transforms.

4. A method for radar Doppler spectral processing, the method comprising:
   (a) collecting a statistical sample set for each Doppler velocity, antenna beam, and radar range using radar Doppler spectral values sampled over time, wherein:
      (i) sampling is done over an observation time period for which atmospheric wind measurements are assumed to be stationary but for which the atmospheric return strength has random variations; and
      (ii) some properties of contamination behave with time over the observation time period differently from behavior of the atmospheric return strength;
   (b) detecting multiple signal sources using differences in statistical and physical properties of those signals sources, wherein:
      (i) a spectral power of an atmospheric signal has an exponential statistical distribution and is generally very weak for clear-air return; and
      (ii) a spectral power of contamination has different statistical distributions and/or relative strength from those of said atmospheric signal;
   (c) a separating of the signals from said different sources over time, over Doppler velocity, over antenna beam, and over radar range;
   (d) identifying said contamination using said statistical and physical properties;
   (e) eliminating said contamination, leaving said atmospheric signal and radar system noise, by setting an acceptance threshold for level of contamination and using said threshold to remove data samples identified as unacceptable from further signal processing;
   (f) identifying said atmospheric signal based upon said statistical properties and physical properties;
   (g) estimating an average spectrum using a subset of samples identified with said atmospheric signal and with said radar system noise; and
   (h) indicating a presence of a useful signal from the atmospheric return.

* * * * *